(12) United States Patent
Berkey et al.

(10) Patent No.: US 11,592,112 B2
(45) Date of Patent: Feb. 28, 2023

(54) LABYRINTH BARRIER WITH MEMBERS CONSTRUCTED OF A SHAPE MEMORY MATERIAL

(71) Applicant: The Boeing Company, Chicago, IL (US)

(72) Inventors: Tyler Emerson Berkey, Charleston, SC (US); Nicholas Page, Ladson, SC (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 17/370,238

(22) Filed: Jul. 8, 2021

(65) Prior Publication Data

US 2022/0018444 A1 Jan. 20, 2022

Related U.S. Application Data

(60) Provisional application No. 63/052,178, filed on Jul. 15, 2020.

(51) Int. Cl.
*F16J 15/447* (2006.01)
*F03G 7/06* (2006.01)
(Continued)

(52) U.S. Cl.
CPC .......... *F16J 15/447* (2013.01); *F01D 11/025* (2013.01); *F02C 7/25* (2013.01); *F02C 7/28* (2013.01);
(Continued)

(58) Field of Classification Search
CPC ............... F03G 7/06114; F03G 7/0613; F03G 7/0614–06147; F03G 7/065;
(Continued)

(56) References Cited

U.S. PATENT DOCUMENTS 5,181,341 A 1/1993 Keys et al.
5,390,974 A 2/1995 Theodorakakos
(Continued)

FOREIGN PATENT DOCUMENTS

EP 0835805 A2 5/2001
EP 1914388 A1 * 4/2008 ............ F01D 11/001
(Continued)

OTHER PUBLICATIONS

Pereiro-Barcelo et al. "Ductility of high-performance concrete and very-high-performance concrete elements with Ni—Ti reinforcements," Construction and Building Materials, May 3, 2018, pp. 531-551, vol. 175, Elsevier.
(Continued)

*Primary Examiner* — Laert Dounis
(74) *Attorney, Agent, or Firm* — Vivacqua Crane, PLLC

(57) ABSTRACT

A labyrinth barrier is disclosed and comprises two or more members each defining respective vertical axes. One or more of the members are constructed at least in part of a shape memory material having a first energy state and a second energy state. The members are oriented relative to one another by their respective vertical axes in an original state to create a flow pathway that restricts fluid flow in a direction transverse to the respective vertical axes. The members are urged towards one another to further restrict the flow pathway when the shape memory material transitions from the first energy state to the second energy state.

20 Claims, 7 Drawing Sheets

(51) Int. Cl.
*F02C 7/28* (2006.01)
*F02K 1/64* (2006.01)
*F02C 7/25* (2006.01)
*F16J 15/16* (2006.01)
*F01D 11/02* (2006.01)

(52) U.S. Cl.
CPC .............. *F02K 1/64* (2013.01); *F03G 7/0614* (2021.08); *F03G 7/06146* (2021.08); *F16J 15/164* (2013.01); *F05D 2240/55* (2013.01); *F05D 2300/505* (2013.01)

(58) Field of Classification Search
CPC ...... F05D 2300/505; F16J 15/447–453; F01D 11/00–24; F01D 25/183; F01D 25/186; F02C 7/25; F02C 7/28
See application file for complete search history.

(56) References Cited

U.S. PATENT DOCUMENTS

| | | | |
|---|---|---|---|
| 5,489,104 | A | 2/1996 | Wolff |
| 5,899,463 | A | 5/1999 | Koch |
| 5,940,788 | A | 8/1999 | Morman et al. |
| 6,394,655 | B1 | 5/2002 | Schnur et al. |
| 6,683,965 | B1 | 1/2004 | Sapiejewski |
| 7,258,347 | B2 | 8/2007 | Keefe et al. |
| 10,571,025 | B2 * | 2/2020 | Takeuchi ............... B64D 41/00 |
| 2003/0019160 | A1 | 1/2003 | Oda et al. |
| 2005/0198907 | A1 | 9/2005 | McKnight et al. |
| 2005/0199440 | A1 | 9/2005 | Keefe et al. |
| 2006/0125188 | A1 | 6/2006 | Verbrugge et al. |
| 2008/0296849 | A1 | 12/2008 | Alacqua et al. |
| 2009/0255187 | A1 * | 10/2009 | Alexander ............. B60J 10/244 49/477.1 |
| 2012/0286480 | A1 | 11/2012 | Efremov |
| 2013/0134679 | A1 * | 5/2013 | Garlapati ............... F16J 15/164 277/590 |
| 2014/0248120 | A1 * | 9/2014 | Graves ............... G05D 23/1854 415/12 |
| 2015/0322807 | A1 * | 11/2015 | Budnick ................ F01D 9/041 277/654 |
| 2015/0353210 | A1 * | 12/2015 | Litwinski ................ C22F 1/006 148/563 |
| 2017/0191565 | A1 | 7/2017 | Cheng et al. |
| 2019/0331226 | A1 | 10/2019 | Pritchard |
| 2019/0338854 | A1 | 11/2019 | Lee et al. |
| 2021/0207714 | A1 * | 7/2021 | Schwendenmann ........................ F01D 11/001 |

FOREIGN PATENT DOCUMENTS

| | | |
|---|---|---|
| EP | 1914388 A1 | 4/2008 |
| EP | 2116621 A2 | 11/2009 |
| FR | 2738046 A1 * | 2/1997 ............ F01D 11/025 |
| JP | H01146070 U * | 10/1989 |
| JP | H0438140 A * | 2/1992 |

OTHER PUBLICATIONS

European Patent Office. Extended European Search Report for EP Application No. 21185337.9, dated Nov. 30, 2021, pp. 1-10.

* cited by examiner

LABYRINTH BARRIER WITH MEMBERS CONSTRUCTED OF A SHAPE MEMORY MATERIAL

CROSS-REFERENCE TO RELATED APPLICATION

This application claims priority to U.S. Provisional Application No. 63/052,178, filed Jul. 15, 2020, The contents of the application are incorporated herein by reference in its entirety.

INTRODUCTION

The present disclosure relates to a labyrinth barrier. More particularly, the present disclosure is directed towards a labyrinth barrier having two or more members that are constructed at least in part of a shape memory material.

BACKGROUND

A labyrinth barrier operates as a non-contact seal between two adjacent compartments. For example, when used in a thrust reverser for an aircraft, the labyrinth barrier creates a torturous pathway that restricts fluid located in an engine core compartment from flowing into another thrust reverser compartment. Specifically, the labyrinth barrier creates an alternate circumferential pathway that is of lower resistance when compared to the axial pathway that otherwise connects the thrust reverser compartments. Therefore, the fluid naturally flows from the engine core compartment towards the alternate pathway provided by the labyrinth barrier. Alternate configurations rely primarily on vortex formation as opposed to flow redirection.

The labyrinth barrier includes multiple elongated members arranged in a staggered pattern. It is to be appreciated that a clearance exists between the members, which creates an imperfect seal. The clearance allows the members to interlock with one another without contacting one another or creating damage when the labyrinth barrier is opened or closed. However, if the clearance is too large, then there is less flow restriction, which in turn reduces the overall effectiveness of the labyrinth barrier. In contrast, if the clearance is too small, then other issues may arise. For example, the individual members of the labyrinth barrier may rub or otherwise contact one another. The contact between the members may create structural issues as well as compromise the effectiveness of the labyrinth barrier.

In another approach, a turkey feather seal may be used instead of a labyrinth barrier in a thrust reverser. A turkey feather seal includes multiple flexible metal segments that overlap one another. The segments deform slightly and directly contact the engine exhaust. However, the environment around the engine is very dynamic and experiences a significant amount of vibration, which in turn adversely affects the turkey feather seal.

SUMMARY

According to several aspects, a labyrinth barrier is disclosed. The labyrinth barrier comprises two or more members each defining respective vertical axes, where one or more of the members are constructed at least in part of a shape memory material having a first energy state and a second energy state. The members are oriented relative to one another by their respective vertical axes in an original state to create a flow pathway that restricts fluid flow in a direction transverse to the respective vertical axes, and the members are urged towards one another to further restrict the flow pathway when the shape memory material transitions from the first energy state to the second energy state.

In another aspect, a labyrinth barrier disposed along two opposing walls is disclosed. The labyrinth barrier comprises two or more members each defining respective vertical axes, where each member includes a proximate end and a distal end, and the proximate end of each of the members is attached to one of the two opposing walls. The members are oriented relative to one another by their respective vertical axes in an original state to create a flow pathway that restricts fluid flow in a direction transverse to the respective vertical axes. The labyrinth barrier also includes an arm corresponding to one or more of the members that are constructed at least in part of a shape memory material having a first energy state and a second energy state. The arm is fixedly attached to a corresponding member and actuates as the shape memory material transitions from the first energy state to the second energy state to urge a distal end of the corresponding member towards the distal end of an adjacent member to further restrict the flow pathway when the shape memory material transitions from the first energy state to the second energy state.

In yet another aspect, method for limiting flow by a labyrinth barrier is disclosed. The method includes creating a flow pathway by two or more members of the labyrinth barrier. Each member defines a respective vertical axis and one or more of the members are constructed at least in part of a shape memory material having a first energy state and a second energy state. The method also includes restricting fluid flow in a direction transverse to the respective vertical axes of the members. The method also includes bringing the shape memory material of one or more of the members to a transition temperature of the shape memory material. The method also includes urging the members towards one another to further restrict the flow pathway as the shape memory material transitions from the first energy state to the second energy state.

The features, functions, and advantages that have been discussed may be achieved independently in various embodiments or may be combined in other embodiments, further details of which can be seen with reference to the following description and drawings.

BRIEF DESCRIPTION OF THE DRAWINGS

The drawings described herein are for illustration purposes only and are not intended to limit the scope of the present disclosure in any way.

FIG. 4A illustrates the member in a first energy state and FIG. 4B illustrates the member after transitioning from the first energy state into a second energy state, according to an exemplary embodiment;

FIG. 5A illustrates the members in a first energy state and FIG. 5B illustrates the members after they have transitioned from the first energy state into the second energy state, according to an exemplary embodiment;

DETAILED DESCRIPTION

The present disclosure is directed towards a labyrinth barrier having two or more members that are constructed at least in part from a shape memory material, where each member defines a respective vertical axis. The shape memory material includes a first energy state and a second energy state, where the shape memory material transitions from the first energy state into the second energy state at a transition temperature. It is to be appreciated that the first energy state may be a high energy state or a low energy state, depending upon the application, and the second energy state depends upon the specific first energy state that is selected. The members are oriented relative to one another by their respective vertical axes in an original state to create a flow pathway that restricts fluid flow in a direction transverse to the respective vertical axes. The members are urged towards one another to further restrict the flow pathway when the shape memory material transitions from the first energy state to the second energy state.

The following description is merely exemplary in nature and is not intended to limit the present disclosure, application, or uses.

Figure 1:
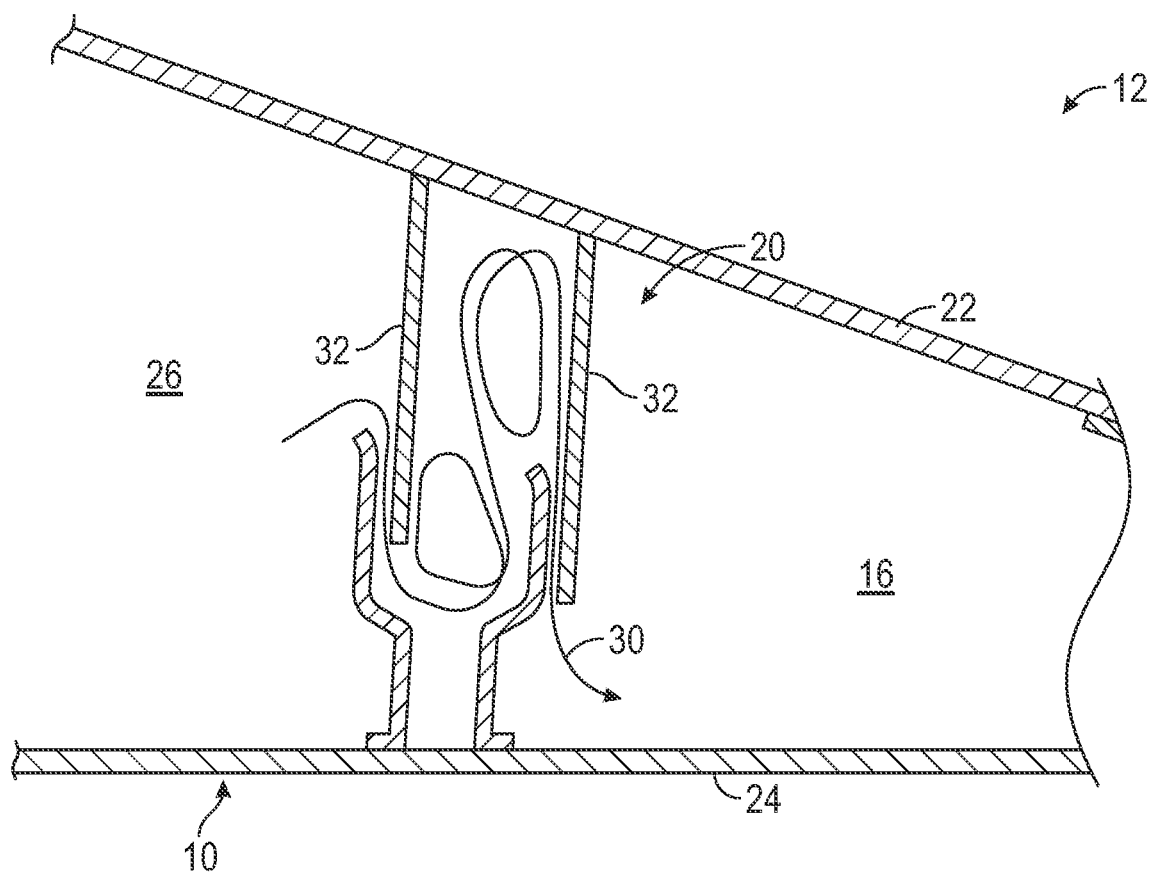
FIG. 1 is a cross-sectioned view of a thrust reverser for an aircraft including the disclosed labyrinth barrier, according to an exemplary embodiment.

Referring to FIG. 1, a portion of a thrust reverser 10 for an aircraft 12 is shown. The thrust reverser 10 includes a thrust reverser compartment 16 and a labyrinth barrier 20. The thrust reverser compartment 16 is defined, in part, by an upper wall 22 and a lower wall 24. The labyrinth barrier 20 is positioned between the thrust reverser compartment 16 and an engine core compartment 26. As seen in FIG. 1, the thrust reverser compartment 16 is located directly adjacent to the engine core compartment 26. A flow pathway 30 is shown, where the flow pathway 30 originates within the engine core compartment 26, flows through the labyrinth barrier 20, and into the compartment 16 of the thrust reverser 10. The labyrinth barrier 20 includes two or more elongated members 32. One or more of the members 32 of the labyrinth barrier 20 are constructed at least in part of a shape memory material 34 (seen in FIG. 2) having a first energy state and a second energy state. As explained below, the labyrinth barrier 20 is configured to either restrict the flow pathway 30 or, alternatively, to act as an anti-fire barrier by blocking the flow pathway 30 when the shape memory material 34 transitions from the first energy state to the second energy state. In the embodiment as shown in FIG. 1, the labyrinth barrier 20 is an anti-fire barrier configured to prevent a flame or flammable fluid that originates within the engine core compartment 26 from entering the thrust reverser compartment 16.

Although FIG. 1 illustrates a thrust reverser 10, it is to be appreciated that the labyrinth barrier 20 may be used in a variety of other applications and is not limited to the embodiment as shown in FIG. 1. Moreover, the disclosed labyrinth barrier 20 is also not limited to an aircraft and may be used in any application where a barrier is required to create a pressure gradient or to restrict flow. For example, in one embodiment, the disclosed labyrinth barrier 20 is employed in a vacuum tube train, which is sometimes referred to as a hyperloop train.

Figure 2:
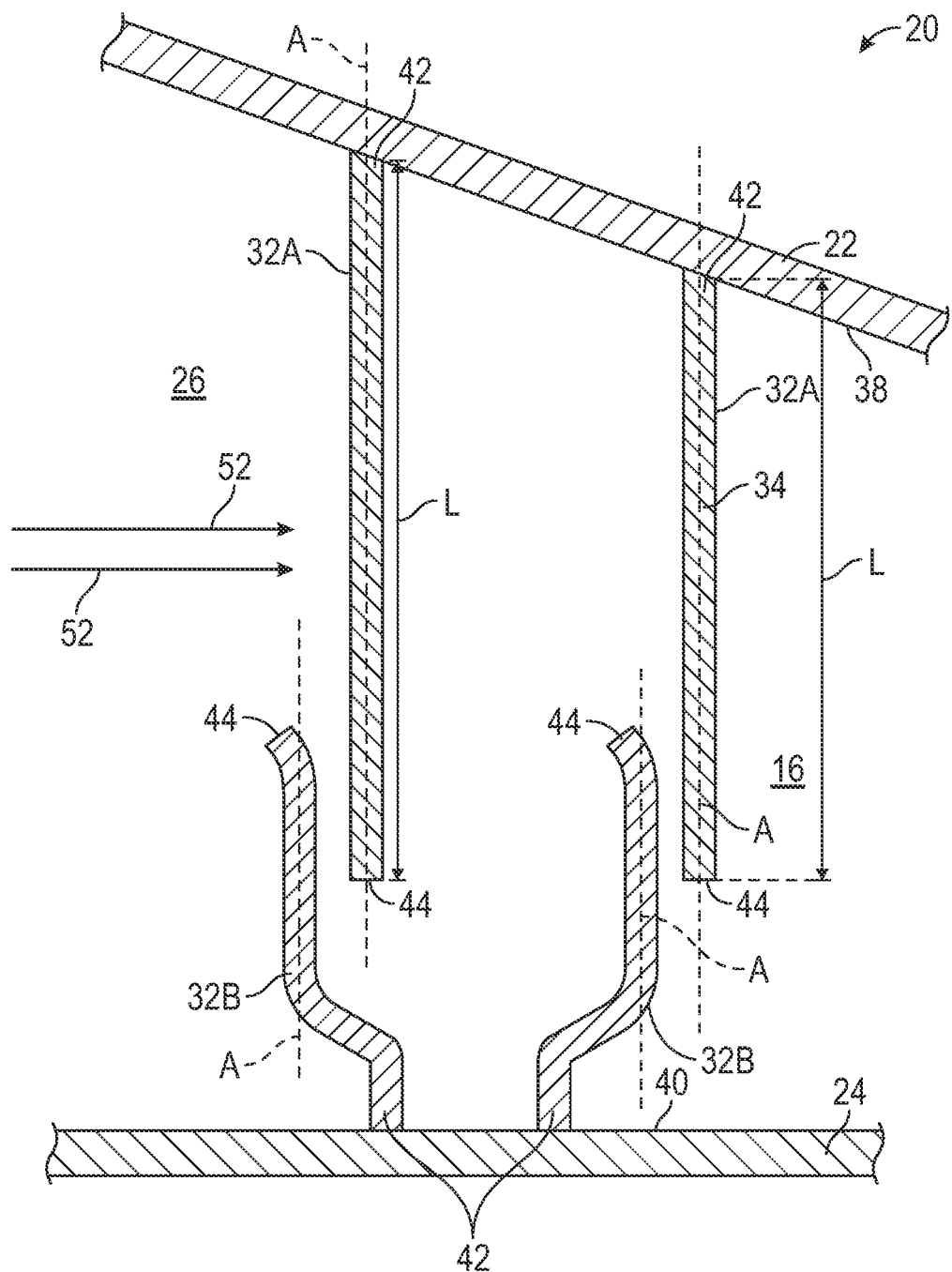
FIG. 2 is an enlarged view of the labyrinth barrier shown in FIG. 1, according to an exemplary embodiment.

FIG. 2 is an enlarged view of the labyrinth barrier 20. In the exemplary embodiment as shown, the labyrinth barrier 20 includes four members 32 arranged in a staggered pattern along two opposing surfaces 38, 40. Specifically, two members 32A are attached to an upper surface 38 of the upper wall 22 and two remaining members 32B are attached to a lower surface 40 of the lower wall 24, where alternating members 32 of the labyrinth barrier 20 are attached to the same surface 38, 40. Accordingly, the members 32 are arranged to create a flow pathway 30 having a winding configuration that restricts the flow between the two adjacent compartments 16, 26. Each member 32 includes a proximate end 42 and a distal end 44, where the members 32 are attached to either the upper surface 38 or the lower surface 40 at their respective proximate ends 42.

In an embodiment, one or more of the members 32 of the labyrinth barrier 20 are constructed entirely from the shape memory material 34. For example, in the non-limiting embodiment as shown in FIG. 2, the members 32 are each constructed entirely from the shape memory material 34. However, as seen in FIGS. 4A, 4B, 5A, and 5B, in another embodiment only a portion of the members 32 are constructed from the shape memory material 34, and a remaining portion of the members 32 are constructed from another material such as, for example, steel, titanium, copper nickel alloys, or composite materials. The shape memory material 34 includes shape memory alloy, a shape memory ceramic, and a shape memory polymer. Some examples of shape memory alloys include, but are not limited to, nickel titanium alloys or nickel copper aluminum alloys. Some examples of shape memory polymers include, but are not limited to, polytetrafluoroethylene (PFTE), polylactide (PLA), and ethylene-vinyl acetate (EVA). As mentioned above, the shape memory material 34 includes the first energy state and the second energy state. Depending upon the application, the first energy state is either a low energy state or a high energy state. The low energy state may be referred to as the martensitic state and the high energy state may be referred to as the austenitic state for a shape memory alloy.

As explained below, the members 32 of the labyrinth barrier 20 are urged towards one another to restrict the flow pathway 30 when the shape memory material 34 transitions from a first energy state to a second energy state. The first energy state may be either the high energy state or the low energy state, depending upon the specific application. As seen in the FIG. 2, the members 32 each define a respective vertical axes A that extend along a length L the respective member 32. The members 32 are illustrated in FIG. 2 in an original state, before the shape memory material 34 transitions from the first energy state to the second energy state. For example, if the labyrinth barrier 20 is part of the thrust reverser 10 shown in FIG. 1, then the member 32 are in the original state before the engines (not shown) of the aircraft 12 are operating and produce the heat.

Referring to both FIGS. 1 and 2, the members 32 are oriented relative to one another by their respective vertical axes A in the original state to create the flow pathway 30. As seen in FIG. 2, a fluid 52 that originates from the engine core compartment 26 that flows towards the thrust reverser compartment 16 is oriented in a direction transverse to the respective vertical axes A of the members 32. In the non-limiting embodiment as shown in FIG. 2, the members 32 are each oriented parallel to one another with respect to their vertical axes A when in the original state. However, it is to be appreciated that the members 32 may also be oriented in other arrangements as well.

Figure 3:
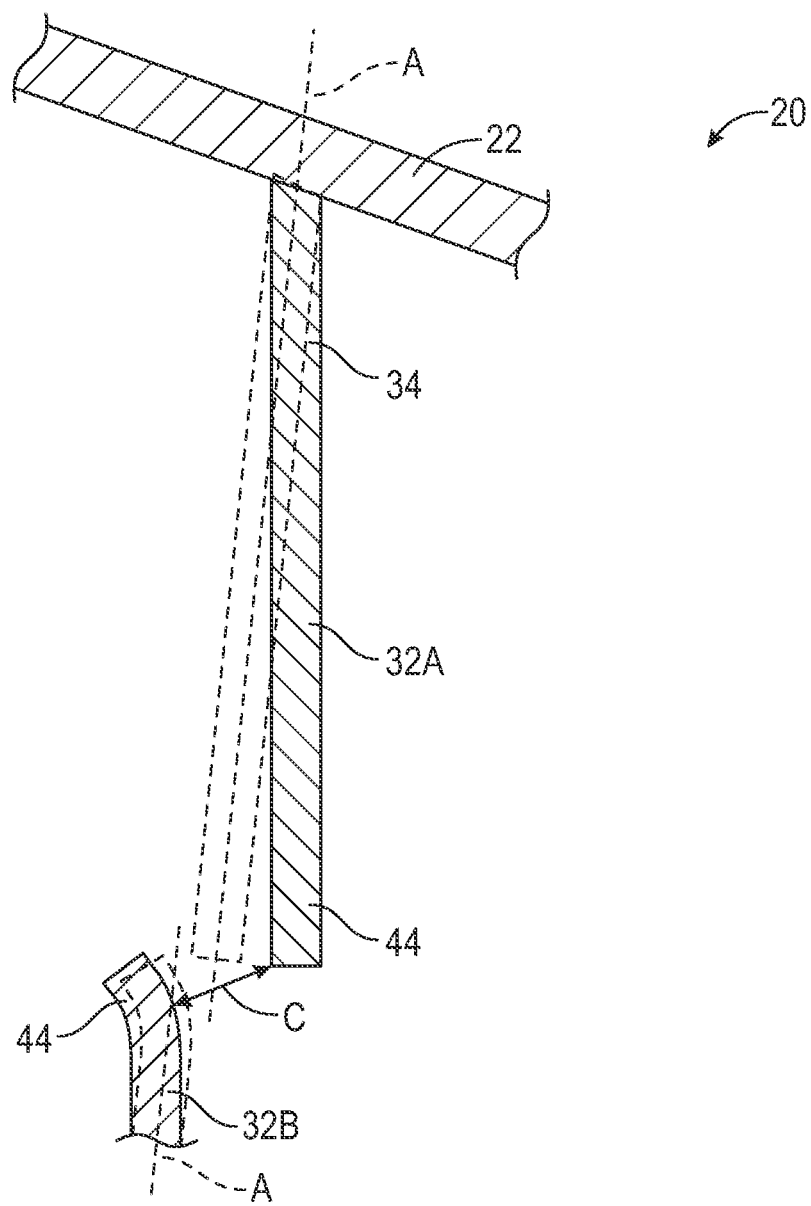
FIG. 3 is an enlarged view of two individual members that are part of the labyrinth barrier shown in FIG. 2, according to an exemplary embodiment.

FIG. 3 is an enlarged view of two adjacent members 32 of the labyrinth barrier 20, where the original state is shown in solid lines and a position of the members 32 after the shape memory material 34 has transitioned from the first energy state to the second energy state is shown in phantom line. The phantom lines illustrate the members 32 being urged towards one another to restrict the flow pathway 30 when the shape memory material 34 transitions from the first energy state to the second energy state. Referring to both FIGS. 2 and 3, in an embodiment the members 32 are oriented parallel to one another with respect to their vertical axes A after the shape memory material 34 transitions from the first energy state to the second energy state as well. In one embodiment, the members 32 are urged towards one another when the shape memory material 34 transitions from the low energy state to the high energy state. Alternatively, in another embodiment, the members 32 are urged towards one another when the shape memory material 34 transitions from the high energy state to the low energy state.

The shape memory material 34 transitions from the first energy state to the second energy state at an activation temperature. In one embodiment, the members 32 are heated to the activation temperature of the shape memory material 34, where the shape memory material 34 transitions from the low energy state to the high energy state. For purposes of this disclosure, when the shape memory material 34 is heated, this does not necessarily require subjecting the shape memory material 34 to temperatures that are above normal room temperature, which ranges from about twenty to twenty-two degrees Celsius (68-72° F.). Instead, the activation temperature of some types of shape memory materials may be at or below room temperature. Alternatively, in another embodiment, the members 32 are cooled or reduced in temperature to the activation temperature, where the shape memory material 34 transitions from the high energy state to the low energy state. For purposes of this disclosure, when the shape memory material 34 is cooled, this does not necessarily require subjecting the shape memory material 34 to temperatures that are less than normal room temperature. It is to be appreciated that the members 32 return to the original state when the shape memory material 34 transitions from the second energy state back to the first energy state.

Referring to FIG. 3, when in the original state, the members 32 of the labyrinth barrier 20 are positioned to create a gap or clearance C. The clearance C is defined as a required distance between two members 32 that are adjacent to one another when in the original state. The clearance C is sized to ensure the members 32 do not contact one another during fabrication and installation, or during the life of the labyrinth barrier 20 because of environmental concerns such as, but not limited to, thermal expansion or vibration. The clearance C is selected based on factors such as, but not limited to, an amount of flow restriction required in the original state, manufacturing tolerances, installation tolerances, vibrations experienced in the immediate vicinity of the labyrinth barrier 20, and thermal expansion. For example, installation tolerances allow for the thrust reverser 10 (FIG. 1) to be opened and closed without having the members 32 contact one another. It is to be appreciated that the clearance C may be greater than the usual clearance that exists between adjacent members in a conventional labyrinth barrier, which is advantageous as this allows for more room during manufacturing and installation.

In one embodiment, the shape memory material 34 is in the low energy state when the members 32 are in the original position, the labyrinth barrier 20 is an anti-fire barrier, and the shape memory material 34 is in the low energy state when the members 32 are in the original position. During operation of the aircraft 12, the members 32 are heated to the activation temperature of the shape memory material 34. In the present example, the activation temperature is indicative of a flame present in an area adjacent to the labyrinth barrier 20. For example, in the embodiment as shown in FIG. 1, the adjacent area is the engine core compartment 26. Therefore, the members 32 are urged towards and contact one another, and the clearance C between two adjacent members 32 is eliminated. As a result, the flow pathway 30 is blocked. However, in some applications where the labyrinth barrier 20 is not an anti-fire barrier, the members 32 do not contact one another, and the clearance C is reduced but not eliminated.

Figure 4B:
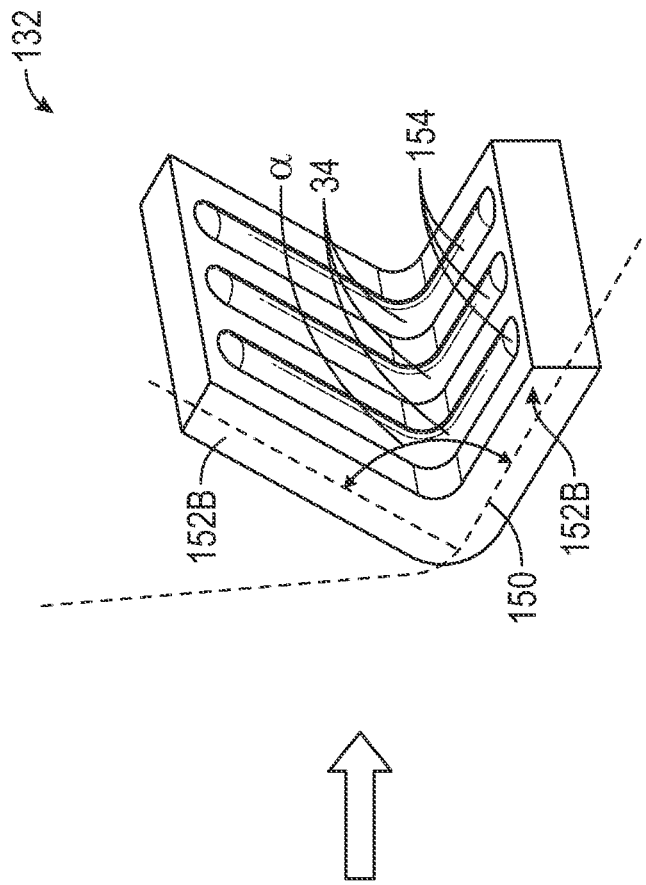
FIGS. 4A and 4B illustrate an alternative embodiment of the members, where
Figure 4A:
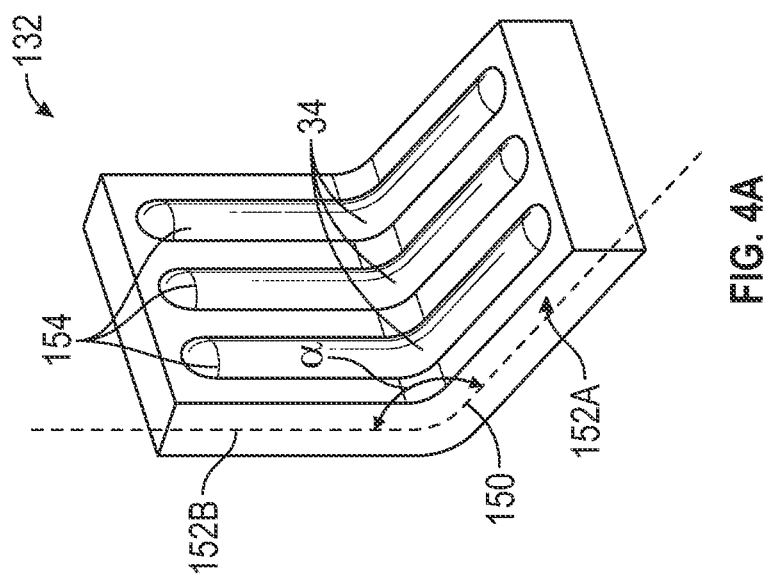

In another approach, only a portion of the members 32 that are part of the labyrinth barrier 20 are constructed of the shape memory material. FIGS. 4A and 4B are a perspective view of another embodiment of one of the members 132 of the labyrinth barrier 20. In the embodiment as shown in FIG. 4A, the member 132 defines a respective cross-sectional profile 150. The cross-sectional profile 150 includes two legs 152A, 152B. One of the legs 152A of the member 132 is attached to a structure, such as the upper wall 22 or the lower wall 24 of the thrust reverser 10 shown in FIG. 1. One or more shape memory segments 154 constructed of the shape memory material 34 extends along the respective cross-sectional profile 150 of the member 132. The shape memory segments 154 are wires, ribbons, or sheets of the shape memory material 34. In the embodiment as shown in FIGS. 4A and 4B, the shape memory segments 154 are embedded within the member 132. In one embodiment, the shape memory segments 154 are attached to the member 132. The shape memory segments 154 may be attached to the member 132 using a variety of approaches. For example, the shape memory segments 154 may be mechanically fastened, bonded to, or embedded within the member 132.

FIG. 4A illustrates the member 132 in the original state, where the legs 152A, 152B are oriented at an angle α relative to one another. In the example as shown in FIG. 4A, the angle α is ninety degrees, and the members 32 are perpendicular to one another. Although FIG. 4A illustrates the legs 152A, 152B oriented perpendicular to one another, it is to be appreciated that FIG. 4A is merely exemplary in nature, and the legs 152A, 152B may be oriented relative to one another in a variety of configurations. Once the shape memory material 34 reaches the respective transition temperature, the shape memory material 34 transitions from the first energy state to the second energy state, and the leg 152B is actuated either towards or away from the other leg 152A. In the example as shown in FIG. 4B, the leg 152B is urged towards the remaining leg 152A, thereby reducing the angle α.

Figure 5A:
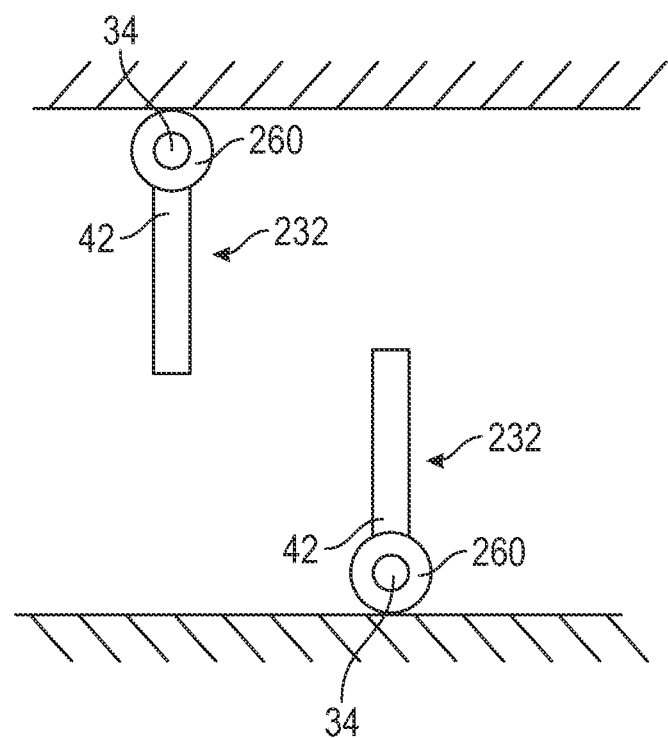
FIGS. 5A and 5B illustrate another embodiment of the members, where
Figure 5B:
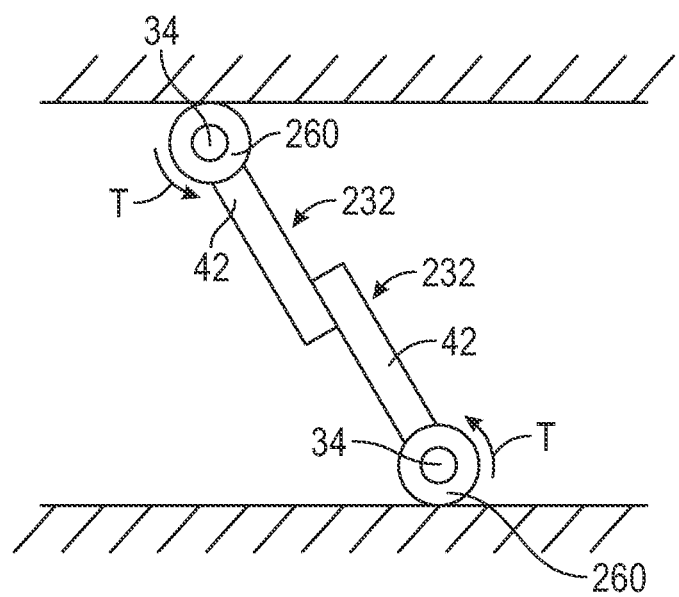

FIGS. 5A and 5B illustrate yet another embodiment of the labyrinth barrier 20, where at least one of the members 232 include a shape memory torque tube 260 constructed of the shape memory material 34. Specifically, in the embodiment as shown, the shape memory torque tube 260 is located at the proximal end 42 of the respective member 232. FIG. 5A illustrates the members 232 in the original state. Once the shape memory material 34 reaches the transition temperature, the shape memory torque tube 260 transmits a torsional force T (FIG. 5B), thereby actuating the members 232 towards one another, which is shown in FIG. 5B.

Figure 6A:
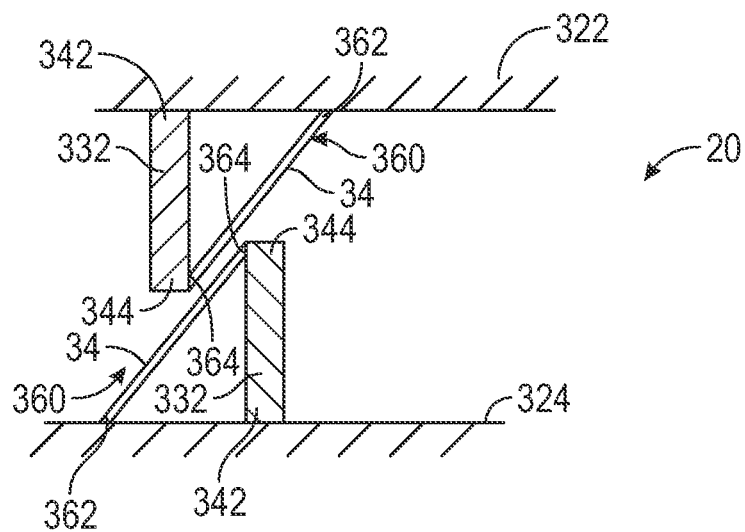
FIGS. 6A and 6B illustrate yet another embodiment of the members and their respective arms that are constructed from a shape memory material, according to an exemplary embodiment.
Figure 6B:
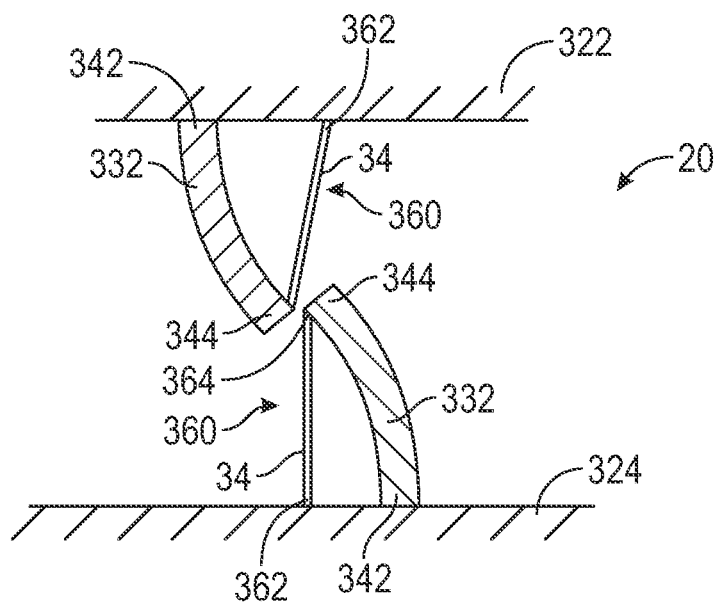

In still another embodiment shown in FIGS. 6A and 6B, the members 332 constructed from a material other than the shape memory material 34. Instead, the members 32 are actuated or urged towards one another using a respective arm 360 constructed of the shape memory material 34. In the embodiment as shown, two adjacent members 332 are disposed along two opposing walls 22, 24. The members 332 each include a proximate end 342 and a distal end 344, where the proximate end 342 of the member 332 is attached a respective wall 322, 324. The arms 360 also include a respective proximate end 362 and a respective distal end 364, where a distal end 364 of a corresponding arm 360 is attached to the distal end 344 of the member 332. The arms 360 are each fixedly attached to a respective wall 22, 24 at the proximate end 362.

In the embodiment as shown, each arm 360 corresponds to a member 332. The arm 360 is constructed at least in part of the shape memory material 34, where the arm 360 is fixedly attached to a corresponding member 332. As seen in FIG. 2, the arm actuates as the shape memory material 34 transitions from the first energy state to the second energy state to urge the distal end 344 of the corresponding member 332 towards the distal end 344 of an adjacent member 332 to further restrict the flow pathway 30 (seen in FIG. 1) when the shape memory material transitions from the first energy state to the second energy state.

Figure 7:
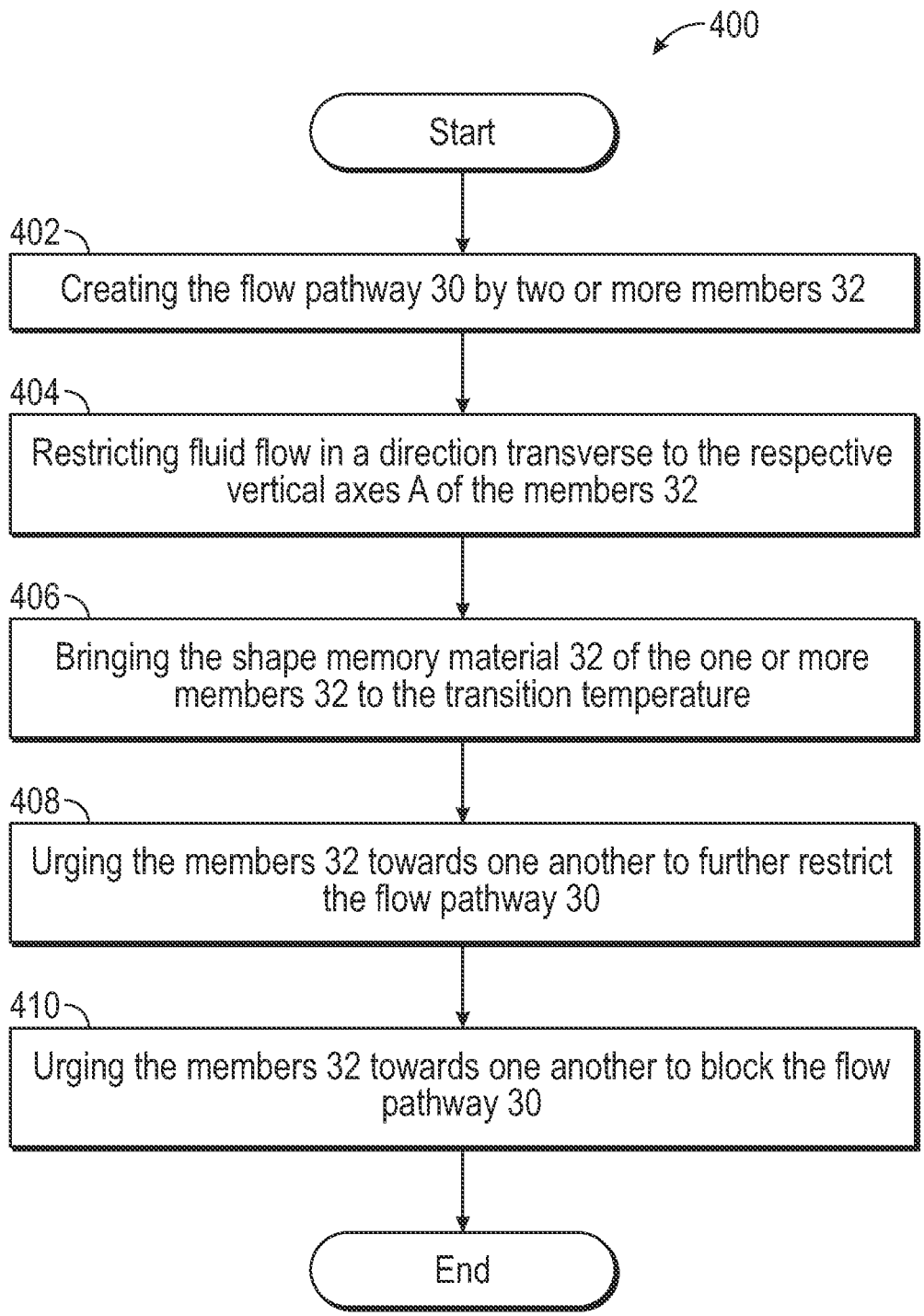
FIG. 7 is a process flow diagram illustrating a method for restricting fluid flow by the labyrinth barrier, according to an exemplary embodiment.

FIG. 7 is an exemplary process flow diagram of a method 400 for actuating the labyrinth barrier 20. Referring generally to FIGS. 1-7, the method 400 begins at block 402. In block 402, the flow pathway 30 (FIG. 1) is created by two or more members 32 each defining a respective vertical axis, where one or more of the members 32 are constructed at least in part of the shape memory material 34. The method 400 may then proceed to block 404.

In block 404, the flow pathway 30 (FIG. 1) restricts fluid flow in a direction transverse to the respective vertical axes A of the members 32. In block 404, the members 32 are in the original state. The method 400 may then proceed to block 406.

In block 406, the shape memory material 34 of one or more of the members 32 is brought to the transition temperature. The shape memory material 34 may be heated or, alternatively, cooled to the transition temperature. The method 400 may then proceed to block 408.

In block 408, the members 32 are urged towards one another to further restrict the flow pathway 30 as the shape memory material transitions from the first energy state to the second energy state. The method 400 may then proceed to block 410.

It is to be appreciated that block 410 is optional and is used when the labyrinth barrier 20 is an anti-fire barrier. In block 410, the members 32 are urged towards one another to block the flow pathway 30, which is shown in FIG. 3. The method 400 may then terminate.

Referring generally to the figures, the disclosed labyrinth barrier provides various technical effects and benefits. Specifically, a clearance exists between the members of the labyrinth barrier, and the clearance is sized as to ensure the members do not contact one another during fabrication and installation, or during the life of the labyrinth barrier 20 because of thermal expansion or vibration. However, once the shape memory material of the members transitions from the first energy state to the second energy state, the members of the labyrinth barrier are urged towards one another to further restrict flow. Accordingly, the members of the disclosed labyrinth barrier are dimensioned to avoid contact issues between the members in the original state, but the shape memory material allows for the members to still be able to block fluid flow when required. Therefore, the disclosed labyrinth barrier overcomes some of the issues faced by conventional barriers by providing sufficient clearance during fabrication, installation, or during operation, while also restricting or blocking the flow of fluid as the shape memory material transitions between phases as well.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A labyrinth barrier disposed along two opposing walls, the labyrinth barrier comprising:
    two or more members each defining respective vertical axes, wherein each member includes a proximate end and a distal end, and the proximate end of each of the members is attached to one of the two opposing walls, and wherein the members are oriented relative to one another by their respective vertical axes in an original state to create a flow pathway that restricts fluid flow in a direction transverse to the respective vertical axes; and
    an arm corresponding to one or more of the members that are constructed at least in part of a shape memory material having a first energy state and a second energy state, wherein a corresponding proximal end of the arm is fixedly attached to one of the two opposing walls and a corresponding distal end of the arm is fixedly attached to the distal end of a corresponding member and actuates as the shape memory material transitions from the first energy state to the second energy state to urge a distal end of the corresponding member towards the distal end of an adjacent member to further restrict the flow pathway when the shape memory material transitions from the first energy state to the second energy state.

2. The labyrinth barrier of claim 1, wherein the shape memory material includes a low energy state and a high energy state.

3. The labyrinth barrier of claim 2, wherein the members are urged towards one another when the shape memory material transitions from the low energy state to the high energy state.

4. The labyrinth barrier of claim 2, wherein the members are urged towards one another when the shape memory material transitions from the high energy state to the low energy state.

5. The labyrinth barrier of claim 1, wherein the members contact one another to block the flow pathway when the shape memory material transitions from the first energy state to the second energy state.

6. The labyrinth barrier of claim 1, wherein the members are oriented parallel relative to one another in the original state.

7. The labyrinth barrier of claim 1, wherein the arm is constructed entirely from the shape memory material.

8. The labyrinth barrier of claim 1, wherein the shape memory material is at least one of a shape memory alloy, a shape memory ceramic, and a shape memory polymer.

9. The labyrinth barrier of claim 1, wherein the shape memory material transitions from a low energy state to a high energy state at an activation temperature.

10. The labyrinth barrier of claim 9, wherein the activation temperature is indicative of a flame present in an adjacent area to the labyrinth barrier.

11. The labyrinth barrier of claim 1, wherein the shape memory material is a shape memory alloy, and the first energy state is a martensitic state and the second energy state is an austenitic state.

12. The labyrinth barrier of claim 1, wherein the two opposing walls are part of a thrust reverser compartment for an aircraft.

13. The labyrinth barrier of claim 12, wherein the labyrinth barrier is positioned between the thrust reverser compartment and an engine core compartment.

14. The labyrinth barrier of claim 1, wherein the labyrinth barrier is an anti-fire barrier.

15. A thrust reverser for an aircraft, comprising:
a thrust reverser compartment comprising opposing walls; and
a labyrinth barrier disposed along the two opposing walls of the thrust reverser compartment, the labyrinth barrier comprising:
two or more members each defining respective vertical axes, wherein each member includes a proximate end and a distal end, and the proximate end of each of the members is attached to one of the two opposing walls, and wherein the members are oriented relative to one another by their respective vertical axes in an original state to create a flow pathway that restricts fluid flow in a direction transverse to the respective vertical axes; and
an arm corresponding to one or more of the members that are constructed at least in part of a shape memory material having a first energy state and a second energy state, wherein a corresponding proximal end of the arm is fixedly attached to one of the two opposing walls and a corresponding distal end of the arm is fixedly attached to the distal end of a corresponding member and actuates as the shape memory material transitions from the first energy state to the second energy state to urge a distal end of the corresponding member towards the distal end of an adjacent member to further restrict the flow pathway when the shape memory material transitions from the first energy state to the second energy state.

16. The labyrinth barrier of claim 15, wherein the shape memory material includes a low energy state and a high energy state.

17. The labyrinth barrier of claim 16, wherein the members are urged towards one another when the shape memory material transitions from the low energy state to the high energy state.

18. The labyrinth barrier of claim 16, wherein the members are urged towards one another when the shape memory material transitions from the high energy state to the low energy state.

19. The labyrinth barrier of claim 15, wherein the members contact one another to block the flow pathway when the shape memory material transitions from the first energy state to the second energy state.

20. The labyrinth barrier of claim 15, wherein the labyrinth barrier is an anti-fire barrier.

* * * * *